United States Patent
Dalaine et al.

(10) Patent No.: US 7,838,771 B2
(45) Date of Patent: Nov. 23, 2010

(54) METHOD FOR PROTECTING A CABLE OR A PIPE

(75) Inventors: Jean-Charles Dalaine, 19 Route de Muzillac, F-58190 Ambon (FR); Christan Langlois, Beauchamp (FR)

(73) Assignee: Jean-Charles Dalaine, Ambon (FR)

( * ) Notice: Subject to any disclaimer, the term of this patent is extended or adjusted under 35 U.S.C. 154(b) by 0 days.

(21) Appl. No.: 11/659,790

(22) PCT Filed: Aug. 12, 2005

(86) PCT No.: PCT/FR2005/002080

§ 371 (c)(1),
(2), (4) Date: Jun. 14, 2007

(87) PCT Pub. No.: WO2006/021683

PCT Pub. Date: Mar. 2, 2006

(65) Prior Publication Data

US 2007/0251715 A1 Nov. 1, 2007

(30) Foreign Application Priority Data

Aug. 12, 2004 (FR) .................................. 04 08856

(51) Int. Cl.
*H02G 15/08* (2006.01)

(52) U.S. Cl. ...................................................... 174/93

(58) Field of Classification Search .................... 174/93, 174/120 R; 138/125
See application file for complete search history.

(56) References Cited

U.S. PATENT DOCUMENTS

| 2,993,949 | A | * | 7/1961 | Moebius et al. .......... 174/124 R |
| 3,379,821 | A | * | 4/1968 | Garner .......................... 174/36 |
| 3,654,027 | A | * | 4/1972 | Middleton ................... 156/438 |
| 3,899,824 | A | * | 8/1975 | Beach .......................... 29/458 |
| 5,176,025 | A | | 1/1993 | Butts et al. |
| 5,544,976 | A | * | 8/1996 | Marchbanks ............. 405/129.6 |
| 5,713,392 | A | | 2/1998 | O'Rourke et al. |
| 5,902,070 | A | | 5/1999 | Bradley et al. |

FOREIGN PATENT DOCUMENTS

FR 2 766 634 1/1999

\* cited by examiner

*Primary Examiner*—Chau N Nguyen
(74) *Attorney, Agent, or Firm*—Young & Thompson

(57) ABSTRACT

Method for protecting a cable or a pipe which includes the following stages: a geotextile strip is shaped like a sheath around the cable or pipe; and the strip is fixed around the cable or pipe. The strip includes a single sheet of at least one layer of nonwoven material. The nonwoven material can be a multilayer material with a central layer of a nonwoven material with a low density and high mechanical strength and at least one outer layer covering it on at least one side, and advantageously on both sides, of higher-density nonwoven material. The geotextile can be heat-sealable and the fixing can in particular be carried out by heat-sealing.

21 Claims, 3 Drawing Sheets

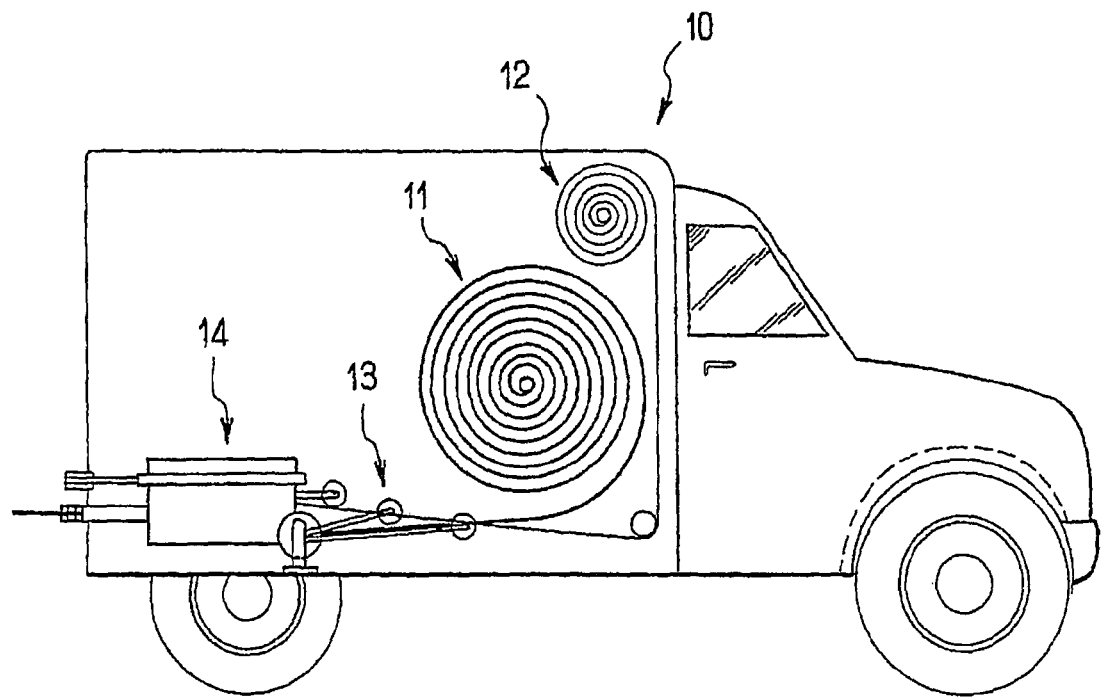
FIG_1
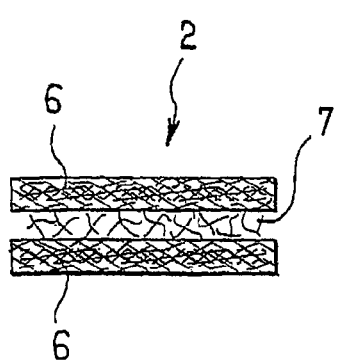
FIG_8
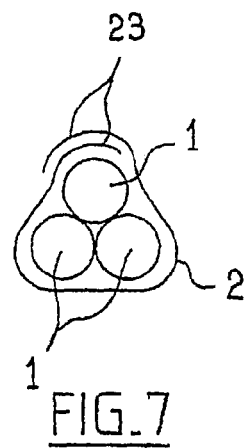
FIG_7

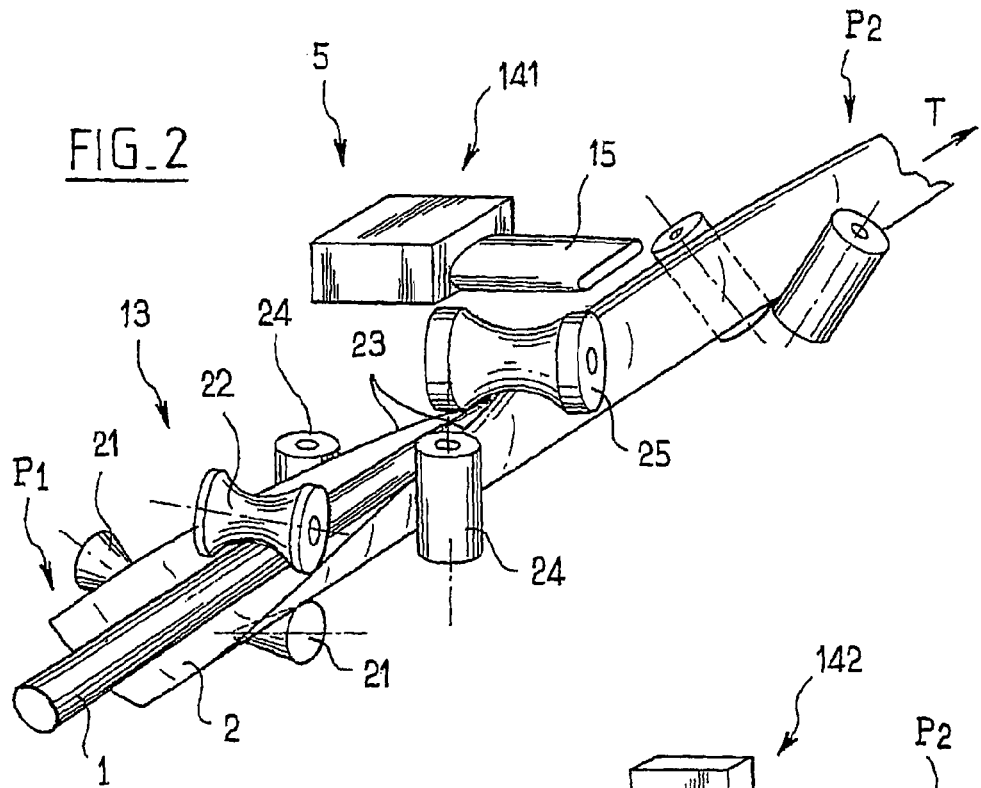
FIG_2
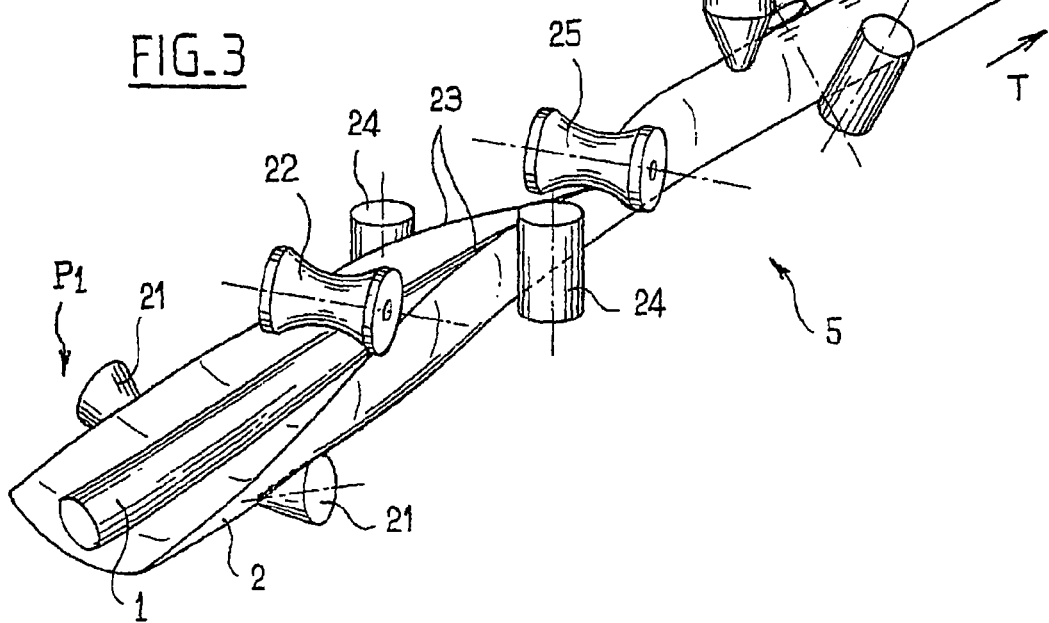
FIG_3

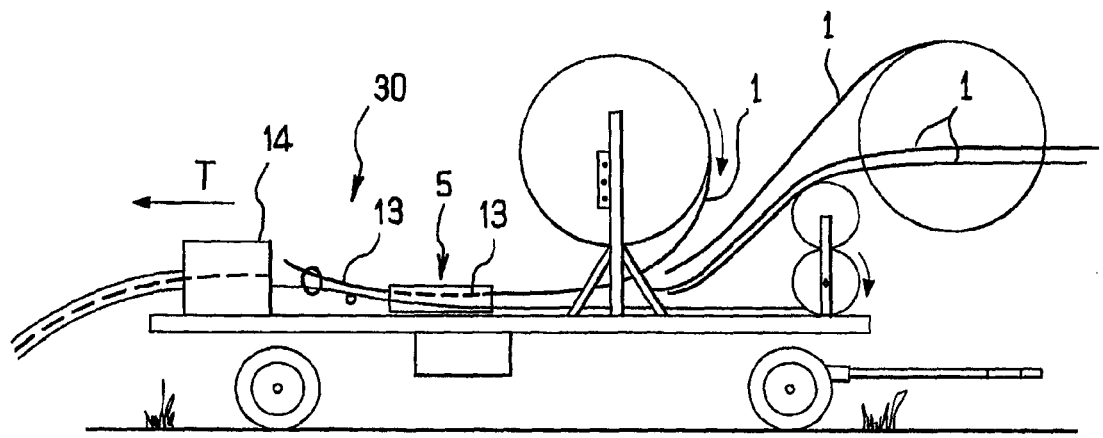
FIG_4
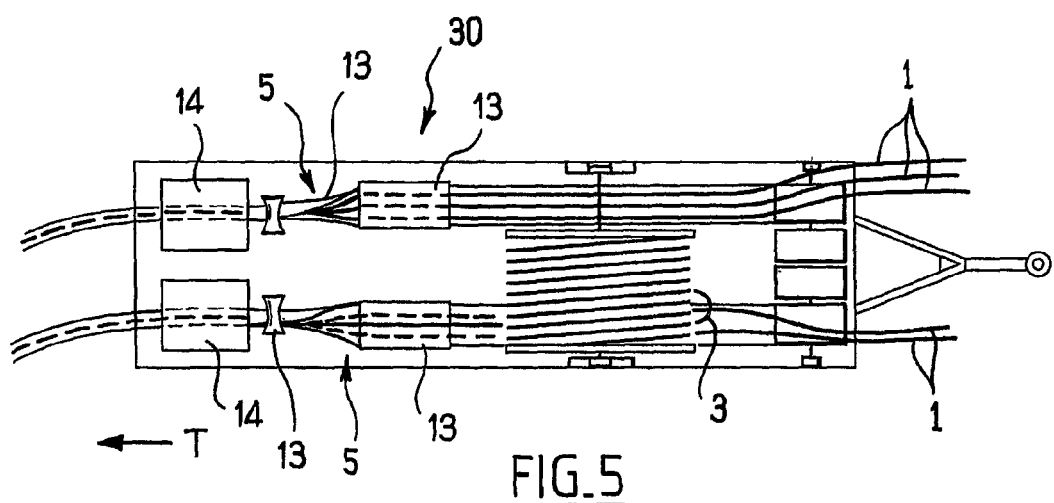
FIG_5
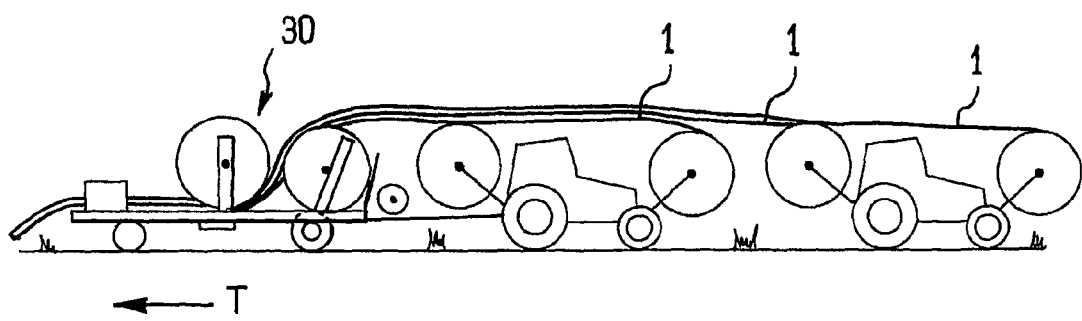
FIG_6

METHOD FOR PROTECTING A CABLE OR A PIPE

BACKGROUND OF THE INVENTION

This invention relates to a method for protecting a pipe, a pipeline or a cable buried in the ground. This invention applies generally to the protection of any object of this type, of elongated form and buried in the ground. These objects are covered by the terms pipe and cable.

Safety standards recommend protecting, in particular, electric cables by surrounding them with sand or very fine sand. This requires, in particular, the removal of excavated earth, the supply, storage and removal from storage of large quantities of high-quality and expensive materials, of sand or very fine sand type. The removal and supply require the use of numerous lorries, which gives rise to nuisance and noise, particularly in towns, as well as pollution.

Research carried out to date on replacing filling with sand or very fine sand have proved inconclusive. Thus, the use of outer shells proves to be expensive, in particular due to numerous cable standards. Similarly, wrapping with an external composite, whilst making it possible to resolve certain drawbacks costs twice as much as filling with very fine sand, can therefore be envisaged only in areas which are difficult to access.

The patent granted under number FR 2 766 634 presents a method for forming a coating made from a particulate material, for example sand or very fine sand, around a pipe or cable, in which a cover is produced in the form of a flexible strip, the cover containing the particulate material between two geotextile sheets, the cover then being folded up around the cable or pipe to be buried. However, such a cover, used over great distances, is bulky and difficult to handle. Moreover, it is difficult to control the distribution of the particulate material in the cover.

The purpose of the invention is to propose a protection method which is economically competitive with simple filling with sand or very fine sand, whilst avoiding, at least to a large extent, the use of sand or very fine sand.

BRIEF SUMMARY OF THE INVENTION

According to the invention, such a method for protecting a cable or a pipe comprises the following stages:
 a geotextile strip is shaped like a sheath around the cable or pipe; and,
 the strip is fixed around the cable or pipe.

It is characterized in that the strip comprises a single sheet comprising at least one layer of nonwoven material.

The sheet can have a tensile strength, measured according to the standard EN ISO 10319, comprised between 30 and 50 kN/m in the machine direction and a tensile strength of 35 to 110 kN/m at right angles to the machine direction. Preferably, it has a tensile strength comprised between 35 and 45 kN/m in the machine direction and/or a tensile strength of 80 to 105 kN/m at right angles to the machine direction.

The sheet can also have an elasticity, measured according to the standard EN ISO 10319, comprised between 50 and 110% in the machine direction and an elasticity comprised between 40 and 80% at right angles to the machine direction. Preferably, it has an elasticity comprised between 80 and 100% in the machine direction and an elasticity comprised between 50 and 70% at right angles to the machine direction.

The sheet can also have a high thermal conductivity, measured at an ambient temperature of approximately 8° C., comprised between 0.05 and 0.9 W/(m·K), preferably greater than 0.07 W/(m·K). A high thermal conductivity is in particular useful for the protection of electric cables. It makes it possible to more easily dissipate the heat produced by the flow of current in the cables.

The mass of the sheet is advantageously comprised between 300 and 2000 g/m$^2$, and preferably between 650 and 1200 g/m$^2$.

The layer of nonwoven material can have a puncture resistance measured according to the standard EN ISO 12236, comprised between 300 and 13000 N or above, preferably between 7000 and 13000 N, still more preferably comprised between 9000 and 12000 N. According to the standard EN 918, this puncture resistance can also be comprised between 0 and 16 mm, preferably between 0 to 5 mm, still more preferably between 0 and 3 mm. A high puncture resistance is particularly useful for protecting pipes which could otherwise be pierced or cracked.

The layer of nonwoven material can have an average porosity, measured using a PMI porosimeter used in aqueous medium, comprised between 25 and 300 μm, preferably comprised between 50 and 150 μm.

The sheet can be monolayer or multilayer. In particular, the at least one layer of nonwoven material can be a central layer of a nonwoven material with a low density and high mechanical strength and the sheet can also comprise at least one outer layer covering it on at least one side, and advantageously on both sides, of higher-density nonwoven material. Each outer layer can have a high thermal conductivity relative to the central layer.

The strip can be fixed by spirally winding.

More advantageously, the strip can comprise, in whole or in part, a heat-sealable material which makes it possible to fix the strip by heat-sealing onto itself. By way of examples, the sealing can thus be done by hot air, by laser or at high frequencies, or also by a mixture of these techniques. The heat-sealable material can be in whole or in part a polypropylene or a polyethylene, or a mixture thereof.

By way of comparison, for a pipe with a diameter of 160 mm buried in the ground in a trench, the use of protection by sand requires 110 to 180 kg of sand per linear metre of pipe, whereas protection according to the invention requires a geotextile strip of 480 grams per linear metre and allows the reuse of all the excavated earth for backfilling the trench, without surpluses.

Such a protection method can moreover allow a relative movement of the terrain and of the cable or pipe, without their being damaged.

Other features and advantages of the invention will also become clear from the description below, relating to non-limitative examples.

In the attached drawings:

BRIEF DESCRIPTION OF THE SEVERAL VIEWS OF THE DRAWINGS

FIG. 1 diagrammatically represents a vehicle equipped for implementing a method according to the invention;

FIG. 2 is a diagrammatic view of a device for the implementation of a method according to the invention, for example in the vehicle in FIG. 1, using a method of fixing by thermo-sealing the strip with hot air;

FIG. 3 is a diagrammatic view of a device for the implementation of a method according to the invention, for example in the vehicle in FIG. 1, using a method of fixing by welding the strip with ultrasound;

FIGS. 4 and 5 are respectively side and top views of a trailer equipped with a device for the implementation of a method according to the invention, using a spiral winder in order to fix a strip;

FIG. 6 represents a cable-laying train using the trailer in FIGS. 4 and 5; and, FIG. 7 diagrammatically represents three cables protected according to the invention; and, FIG. 8 is a cross-section and diagrammatic view of a geotextile strip 1, used in a method according to the invention.

DETAILED DESCRIPTION OF THE INVENTION

In order to simplify the description, the laying of a cable will be considered. The same means and the same methods can also be used in particular for laying a flexible pipe.

Apart from the earth-moving equipment, the equipment necessary for connecting a consumer to the utilities networks is generally very compact. In fact, the lengths and the diameters of cables are small, and consequently the widths and the lengths of the geotextile strips used for their protection are also small. This equipment can be transportable in a van-type vehicle 10, as shown in FIG. 1. This equipment is described in more detail with reference to FIGS. 2 and 3. It comprises a drum 11 for the cable, a drum 12 for the geotextile, a former 13 for shaping the geotextile around the cable, and a fixing unit 14.

FIG. 8 represents a cross-section of a geotextile strip used in the protection method according to the invention. This strip is formed from a single geotextile sheet. This sheet comprises an inner layer 7 of low-density nonwoven material sandwiched between two outer layers 6 of high-density geotextile.

FIGS. 2 and 3 partially illustrate two embodiments of a protection device 5 which makes it possible to implement a method according to the invention. The parts illustrated can equip, for example, the van in FIG. 1.

These parts include a former 13 and means of fixing 141, 142 by sealing a heat-sealable geotextile 2 around a cable 1. The tension direction, i.e. the direction of the relative movement of the cable and of the geotextile in relation to the device is indicated by the arrow T.

The cable is progressively placed on the geotextile in the form of a substantially flat strip upstream P1 of the device. Then, the former 13 folds the geotextile up around the cable so as to form a sheath around the cable.

The former comprises, from upstream P1 to downstream P2, firstly tapered rollers arranged under the geotextile strip and a presser roller 22 which holds the cable on the strip, such that the strip takes the form of a V. Beyond this, the two side edges 23 are held vertical between vertical rollers 24. Finally a roller in the shape of a diabolo 25 makes it possible to turn down the side edges one over the other and to hold them there.

The covering of one edge over the other is sufficient to allow a solid seal of one edge on the other. A covering width representing 10 to 20% of the width of the strip is generally sufficient.

The devices of FIGS. 2 and 3 differ in the sealing method used. In FIG. 2, the sealing is carried out with a nozzle 15 blowing hot air. In FIG. 3, the sealing is carried out by an ultrasound welding unit 142.

Downstream of the sealing means, rollers make it possible to support and laterally hold the cable in its sheath, in a position suited to its sealing.

In the case of the laying of cable over great lengths, and/or of cables with a large diameter, a trailer 30 as shown in FIGS. 4 and 5 can be used. Such a trailer makes it possible to use more bulky equipment which could not be contained in a van as described previously.

The trailer in the example described comprises two protection devices 5 as described with reference to FIGS. 2 and 3. In the case illustrated, it is provided for protecting three cables 1 in each device 5 and by the same geotextile sheath. FIG. 7 is a cross-section of the three cables arranged in a trefoil shape in the geotextile sheath 2.

The trailer carries two cable drums 11 and two geotextile drums 12, each cable drum and each geotextile drum being respectively assigned to one of the protection devices. As illustrated in FIG. 6, the trailer forms part of a cable-laying train 31. This train comprises two vehicles 32 each carrying two other cable drums 11. One of the vehicles 32 is used as a tractor for the trailer 30.

The quality of the work carried out is improved in comparison with filling. Thus, the protection being implemented as the cable or the pipe is unrolled, the latter is protected even before backfilling the trench. The wrapping is made regular, in particular by mechanization. Moreover, the geotextile can be chosen according to its intended purpose. Thus, preference will be given to a high thermal conductivity for protecting an electric cable, and preference will be given to puncture resistance for protecting a pipe. Moreover, the geotextile retains its qualities over time. It is not subjected to washing out or creep as can be the case with a powdery material, sand or very fine sand.

Moreover, the utilization of a geotextile is easy. It can in particular be cut out manually with a cutter and their low weight, 10 to 80 kilograms, makes handling the reels easy.

Solely by way of example, it is possible to use a monolayer sheet chosen from the following geotextile references, supplied by Fibertex™: Fibertex F-43 S, Fibertex F-500, Fibertex F-400M, Fibertex F-650M and Fibertex F-1200M.

Of course, the invention is not limited to the examples which have just been described and numerous adjustments can be made to these examples, without exceeding the scope of the invention.

The strip can be replaced by two (or more) strips, one being laid under a cable and the other covering it, the two strips (or more) then being fixed to each other over the cable.

The fixing by sealing can be replaced by a fixing using a spiral winder which surrounds the geotextile sheath with one or more tapes over the whole necessary length. The geotextile sheath can also be surrounded with a wire stretched spirally around the sheath. A covering of the geotextile representing from 10 to 20% of the width of the initial strip is generally sufficient.

In particular for point fixings, portable air-nozzle sealing can be provided, optionally a simple hairdryer, or a fixing using a male Velcro™-type tape.

For laying great lengths of cable or pipe, or over non-practicable terrains, the van can be replaced by a framework on caterpillar tracks. Such top-of-the-range equipment can be provided in order to be capable of carrying and protecting according to the invention 2 HTA 95/240 mm$^2$ cables or an HDPE pipe with a diameter of 160 mm.

Such a method can also be used with equipment suitable for laying rigid or semi-rigid pipes.

The invention claimed is:
1. A method for producing at least one protected utilities-to-consumer cable or pipe, in which a geotextile strip comprising a single sheet of at least one layer of nonwoven material is shaped and fixed around said cable or pipe, said method comprising the steps of progressively bringing the cable or pipe and the geotextile in mutual proximity as the cable or pipe and the geotextile are unrolled from respective drums, said geotextile being in the form of a substantially flat strip, which has two side edges extending substantially parallel to the cable or pipe, folding the geotextile strip around the cable or pipe so as to form a sheath around it, in such a way that one side edge is displaced around the pipe until said one side-edge overlaps the other side edge, sealing the geotextile strip around the cable or pipe.

2. The method according to claim 1, wherein the sheet has a tensile strength comprised between 30 and 50 kN/m in the machine direction, and a tensile strength of 35 to 110 kN/m at a right angle to the machine direction, measured according to the standard EN ISO 10319.

3. The method according to claim 1, wherein the sheet has an elasticity comprised between 50 and 110% in the machine direction, and an elasticity comprised between 40 and 80% at a right angle to the machine direction, measured according to the standard EN ISO 10319.

4. The method according to claim 1, wherein the sheet has a thermal conductivity comprised between 0.05 and 0.9W/(m·K), measured at an ambient temperature of approximately 8° C.

5. The method according to claim 1, wherein the mass of the sheet is comprised between 300 and 2000 g/m$^2$.

6. The method according to claim 1, wherein the geotextile strip comprises a heat-sealable material, and the geotextile strip is fixed by thermo-sealing onto itself.

7. The method according to claim 6, wherein the thermo-sealing is carried out by hot air.

8. The method according to claim 6, wherein the thermo-sealing is carried out at a high frequency and/or with a laser.

9. The method according to claim 6, wherein the geotextile strip comprises at least a polypropylene and/or a polyethylene.

10. The method according to claim 1, wherein a first part of the geotextile strip is shaped like a sheath around the cable or pipe, downstream, a second part of the geotextile strip already shaped like a sheath is fixed around the cable or pipe, and further downstream, a third part of the geotextile strip already fixed around the cable or pipe is buried in the ground with the cable or pipe.

11. The method according to claim 1, wherein the at least one layer of nonwoven material has a puncture resistance above 300 N, measured in accordance with the standard EN ISO 12236.

12. The method according to claim 11, wherein the at least one layer of nonwoven material has a puncture resistance comprised between 9000 and 12000 N, measured in accordance with the standard EN ISO 12236.

13. The method according to claim 1, wherein the at least one layer of nonwoven material has a puncture resistance comprised between 0 and 16 mm, measured in accordance with the standard EN 918.

14. The method according to claim 13, wherein the at least one layer of nonwoven material has a puncture resistance comprised between 0 and 3 mm, measured in accordance with the standard EN 918.

15. The method according to claim 1, wherein the at least one layer of nonwoven material has an average porosity comprised between 25 and 300 μm, measured using a PMI porosimeter used in an aqueous medium.

16. The method according to claim 1, wherein the sheet is a monolayer.

17. The method according to claim 1, wherein the sheet is a multilayer.

18. The method according to claim 17, wherein said sheet comprises at least one layer of nonwoven material that is a central layer of a nonwoven material with a low density and high mechanical strength, and at least one outer layer of higher-density nonwoven material covering said central layer on at least one side.

19. The method according to claim 18, wherein the central layer is covered on both sides with outer layers of high-density nonwoven materials.

20. The method according to claim 19, wherein the at least one layer of non-woven material has at least one of the following characteristics:
   (i) a tensile strength comprised between 35 to 45 kN/m in the machine direction, measured according to the standard EN ISO 10319;
   (ii) a tensile strength comprised between 80 and 105 kN/m at a right angle to the machine direction, measured according to the standard EN ISO 10319;
   (iii) an elasticity comprised between 80 and 100%, in the machine direction, measured according to the standard EN ISO 10319;
   (iv) an elasticity comprised between 50 and 70% at a right angle to the machine direction, measured according to the standard EN ISO 10319;
   (v) a thermal conductivity above 0.07 W/(m·K) measured at an ambient temperature of approximately 8° C.;
   (vi) a sheet mass comprised between 650 and 1200 g/m$^2$;
   (vii) a puncture resistance comprised between 7000 and 13000 N, measured in accordance with the standard EN ISO 12236;
   (viii) a puncture resistance comprised between 0 and 8 mm, measured in accordance with the standard EN 918; and
   (ix) an average porosimeter comprised between 50 and 150 μm, measured using a PMI porosimeter used in aqueous medium.

21. The method according to claim 18, wherein each outer layer has a high thermal conductivity.

* * * * *